United States Patent
Iqbal et al.

(10) Patent No.: US 9,197,457 B1
(45) Date of Patent: Nov. 24, 2015

(54) METHOD AND APPARATUS FOR ADAPTIVE EQUALISATION USING PARTICLE SWARM OPTIMIZATION FOR UPLINK SC-FDMA

(71) Applicant: King Fahd University of Petroleum and Minerals, Dhahran (SA)

(72) Inventors: Naveed Iqbal, Dhahran (SA); Azzedine Zeguine, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 14/642,917

(22) Filed: Mar. 10, 2015

(51) Int. Cl.
*H03H 7/30* (2006.01)
*H03H 7/40* (2006.01)
*H03K 5/159* (2006.01)
*H04L 25/03* (2006.01)

(52) U.S. Cl.
CPC .... *H04L 25/03057* (2013.01); *H04L 25/03082* (2013.01); *H04L 25/03159* (2013.01)

(58) Field of Classification Search
CPC .................. H04L 25/03057; H04L 25/03159; H04L 25/03082
USPC ................... 375/233, 232, 230; 708/322, 323
See application file for complete search history.

(56) References Cited

U.S. PATENT DOCUMENTS

| 7,212,569 B1* | 5/2007 | Clark .................... H04L 25/022 375/233 |
| 7,460,594 B2 | 12/2008 | Yousef |
| 8,615,035 B2 | 12/2013 | Wei et al. |
| 2013/0100920 A1* | 4/2013 | Nakamura ............ H04L 5/0023 370/329 |

FOREIGN PATENT DOCUMENTS

| CN | 101789920 A | 7/2010 |
| CN | 101980470 A | 2/2011 |

OTHER PUBLICATIONS

Tan, et al., "Carrier frequency offsets estimation for uplink OFDMA systems using enhanced PSO and multiple access interference cancellation", 2011, IEEE, pp. 1436-1441.
Wen, et al., "A suboptimal pts algorithm based on particle swarm optimization technique for PAPR reduction in OFDM systems", 2008, EURASIP Journal on Wireless Communications and Networking, vol. 2008, Article ID 601346, http://jwcn.eurasipjournals.com/content/pdf/1687-1499-2008-601346.pdf.
Kumar, et al., "Analysis of Power Spectrum for Linear Equalizer and Decision Feedback Equalizer in LTE SC-FDMA", May 2014, International Journal of Advanced Research in Computer Science and Software Engineering, vol. 4, Issue 5, http://www.ijarcsse.com/docs/papers/Volume_4/5_May2014/V4I5-0838.pdf.

* cited by examiner

*Primary Examiner* — Phuong Phu
(74) *Attorney, Agent, or Firm* — Oblon, McClelland, Maier & Neustadt, L.L.P.

(57) ABSTRACT

A method and apparatus are provided for channel equalization in a communication system. The channel equalization method includes calculating, using processing circuitry, filter coefficients of an adaptive equalizer in a frequency domain using particle swarm optimization (PSO) and filtering the signal using the computed filter coefficients.

7 Claims, 8 Drawing Sheets

METHOD AND APPARATUS FOR ADAPTIVE EQUALISATION USING PARTICLE SWARM OPTIMIZATION FOR UPLINK SC-FDMA

BACKGROUND

In wireless communication, it is often desirable to reduce intersymbol interference to allow recovery of transmitted symbols. Due to time-varying properties of a communication channel, an adaptive equalizer is often used.

There exist several algorithms for adaptive equalization to deal with time-varying channels such as least mean squares (LMS) and recursive least squares (RLS) algorithms as described in Haykin, S., "Adaptive filter theory", Prentice-Hall, 2002. However, their performance degrades in channels having a large eigenvalue spread. Recently, particle swarm optimization (PSO) has been used for adaptive estimation/equalization problems and showed its improved performance when compared with other conventional algorithms as described in Krusienski, D. J., and Jenkins, W. K., "The application of particle swarm optimization to adaptive IIR phase equalization", ICASSP, Montreal, Quebec, Canada, May 2004, pp. 693-696, Liu, H., and Li, J., "A particle swarm optimization-based multiuser detection for receive-diversity-aided STBC systems", IEEE Signal Process. Lett., 2008, 15, (3), pp. 29-32, and Al-Awami, A. T., Zerguine, A., Cheded, L., Zidouri, A., and Saif, W., "A new modified particle swarm optimization algorithm for adaptive equalization", Digital Signal process., 2011, 21, pp. 195-207.

The foregoing "background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention. The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY

The present disclosure relates to a method for channel equalization in a communication system that receives, by a receiver, a signal, demaps, using processing circuitry, the signal, calculates, using the processing circuitry, filter coefficients of an adaptive equalizer in a frequency domain using particle swarm optimization (PSO), and filters the signal using the computed filter coefficients.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Referring now to the drawings, wherein like reference numerals designate identical or corresponding parts throughout several views, the following description relates to a frequency domain equalizer for adaptive equalization using particle swarm optimization.

For clarity, the following nomenclature is used in much of the description below. Matrices and vectors are denoted by bolded upper case.

Single Carrier Frequency Division Multiple Access (SC-FDMA) is an uplink transmission method for multi-user access scenarios. A SC-FDMA system has many advantages such as low peak-to-average power ratio. SC-FDMA is used as the uplink transmission method in Long Term Evolution (LTE) systems. SC-FDMA has been also adopted as the uplink access scheme in Evolved Universal Terrestrial Radio Access (S-UTRA).

Particle swarm optimization (PSO) is a computational method that optimizes a problem by iteratively trying to improve a candidate solution with regard to a given measure of quality with fast convergence as described in Kennedy, J. and Eberhart, R., "Swarm intelligence", Academic Press, London, UK, 2001. It is used to minimize continuous and real-valued function in an l-dimensional space. A swarm, also known as population, is comprised of particles that move in a predefined search space. The position of each particle within the search space represents the potential solution to the problem.

In this disclosure, PSO is used in an adaptive frequency-domain (FD) equalizer for the SC-FDMA system. The adaptive frequency domain equalizer has less computational complexity as compared to an adaptive time-domain (TD) equalizer. In selected embodiments, a decision feedback equalizer (DFE) with separate fitness functions, for the feedforward and the feedback filters, developed entirely in the FD is used.

Figure 1:
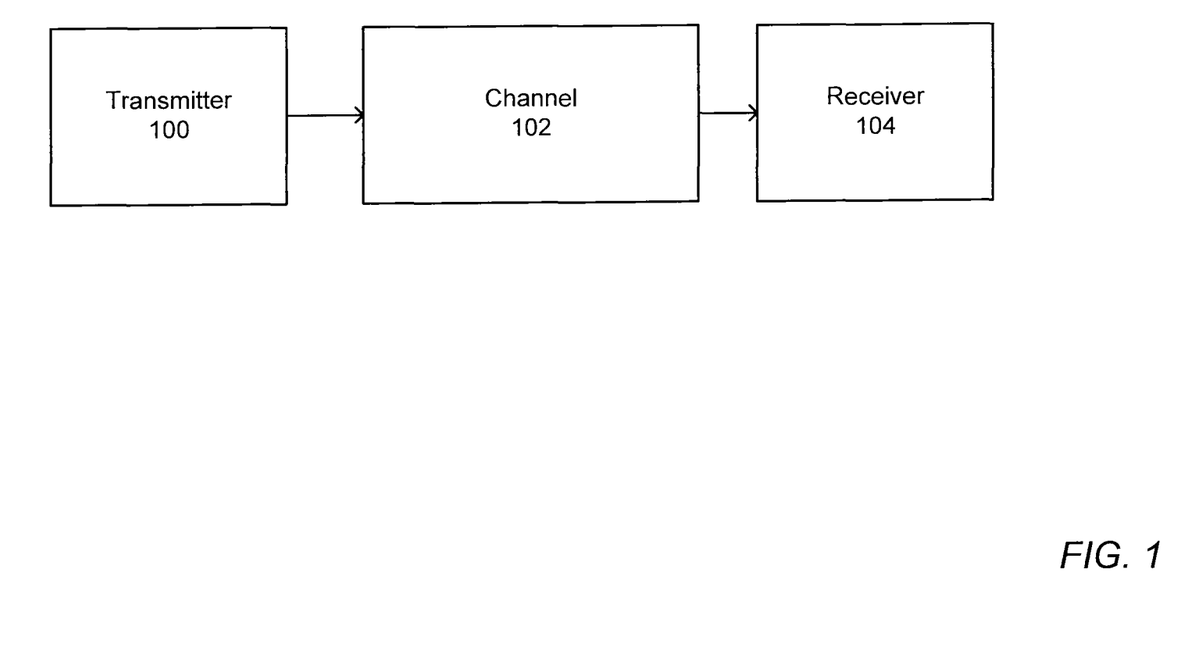
FIG. 1 is a schematic diagram of a communication system according to one example.

FIG. 1 is a schematic diagram of a communication system according to one example. The communication system may include a transmitter 100 and a receiver 104. Data between the transmitter 100 and the receiver 104 is transmitted via communication channel 102. The transmitter 100 may be any electronic subsystem that produces a modulated signal. The receiver 104 obtains input sample via the communication channel 102 and performs equalization on the input samples to obtain block estimates, which are estimates of transmit blocks (transmitted by the transmitter 100). A data block may be also called a packet, a frame, and so on.

Figure 2:
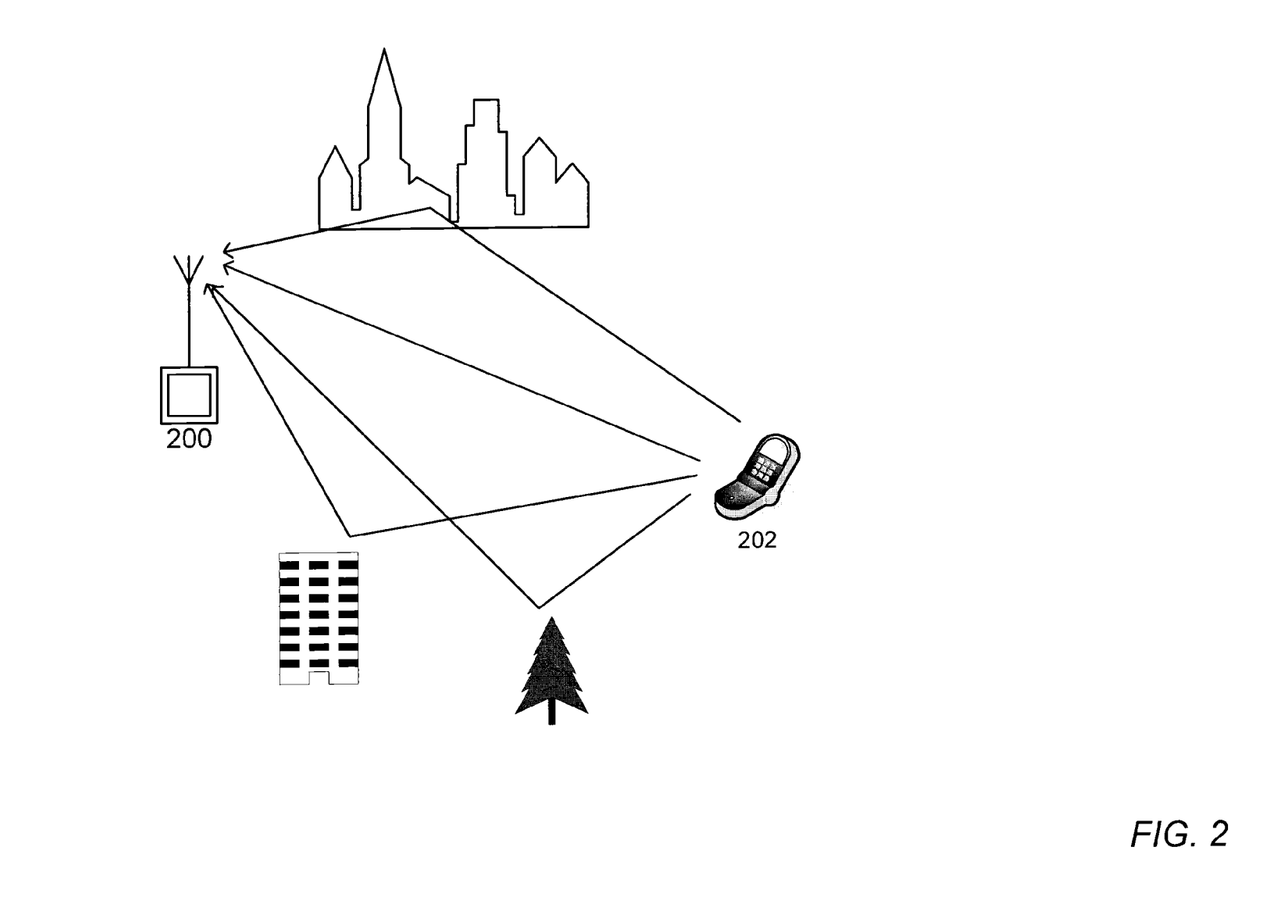
FIG. 2 is a schematic diagram that shows a transmission from a wireless device to a base station according to one example.

FIG. 2 is a schematic diagram that shows a transmission from a wireless device to a base station according to one example. FIG. 2 shows a base station 200 and a wireless device 202. In an uplink transmission system, the transmitter 100 is part of the wireless device 202 and the receiver 104 is part of the base station 200. In other embodiments, the transmitter 100 may be part of the base station 200, and the receiver 104 is part of the wireless device 202. The base station 200 is typically a fixed station that communicates with the wireless devices 100. The wireless device 202 may be fixed or mobile. The wireless device 202 may be a cellular phone, a personal digital assistant (PDA), a wireless modem card, or the like. The wireless device 202 may transmit a signal to the base station 200. The signal may be a radio frequency (RF) signal. The signal may reach the base station 200 is one or more signal paths as shown in FIG. 2. The signals may include a direct path and reflected paths. The reflected paths may be created by reflections from obstacles such as trees, buildings, or other structures. A received RF signal at the base station 200 is a superposition of all received signals at the base station 200.

Figure 3:
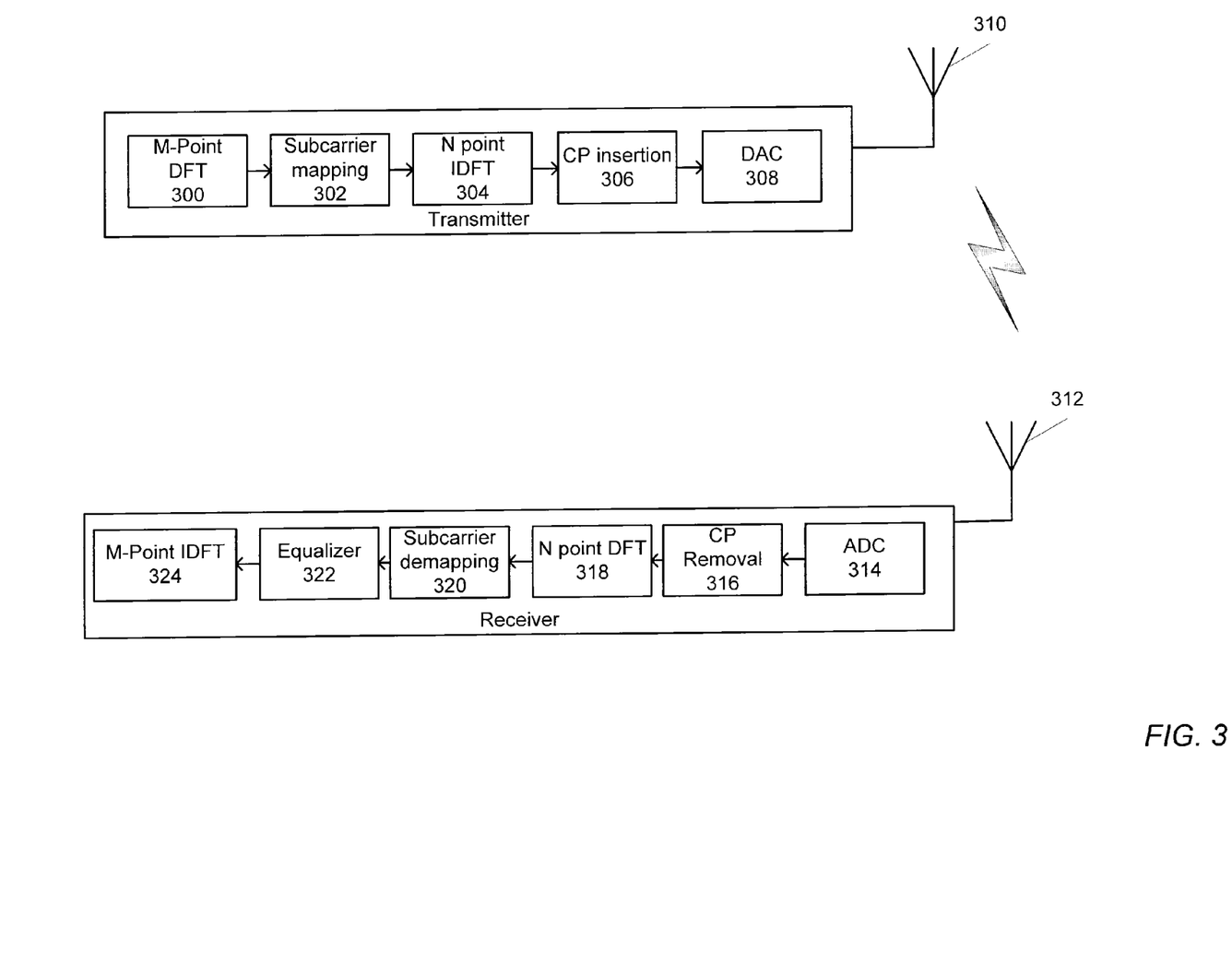
FIG. 3 is a block diagram representation of a communication system according to one example.

FIG. 3 is a block diagram representation of a communication system according to one example. The communication system may be an uplink SC-FDMA system having K users and a total of N subcarriers, with each user assigned M subcarriers, i.e. N=KM. The transmitter 100 of the SC-FDMA system may include an M-point discrete Fourier transform (DFT) module 300, a subcarrier mapping module 302, an N-point inverse discrete Fourier transform (IDFT) module 304, a cyclic prefix insertion module 306, and a digital to analog converter (DAC) 308. The modulated signal is transmitted by an antenna 310. Each of the modules described herein may be implemented in circuitry that is programmable (e.g. microprocessor-based circuits) or dedicated circuits such as application specific integrated circuits (ASICS) or field programmable gate arrays (FPGAS). An exemplary uplink SC-FDMA system is described in Zhang, C., Wang, Z., Yang, Z., Wang, J., and Song, J., "Frequency domain decision feedback equalization for uplink SC-FDMA", IEEE Trans. Broadcast, 2010, 56, pp. 253-257, incorporated herein by reference in its entirety. The transmitter 100 groups modulation symbols into blocks each containing M symbols. The M-Point DFT module 300 performs an M-point DFT to produce a frequency domain representation of the input symbols. The subcarrier mapping module 302 maps each of the M-DFT outputs to one of the N orthogonal subcarriers that can be transmitted. The transmitter 100 may use any suitable subcarrier mapping technique such as distributed subcarrier mapping, localized carrier mapping, or other techniques as would be understood by one of ordinary skill in the art. The case of N=KM for the distributed mode with equidistance between occupied subcarrier is called Interleaved FDMA (IFDMA). The N orthogonal subcarriers may be predefined. The N-point IDFT module 304 transforms the subcarrier amplitudes to a complex time domain signal. The CP insertion module 306 may insert a cyclic prefix (CP) to the block which may be a repeated portion of the last part of the block. The CP may be added at the beginning of the block. The CP is used to combat inter-block interference (IBI). Inter-block interference is due to multipath propagation. The digital signal is transformed into an analog signal by the DAC 308 and then may be modulated to radio frequency.

At the receiver 104, the reverse operations are performed. An antenna 312 receives the modulated signal and provides the modulated signal to an analog to digital converter (ADC) 314. Then, a CP removal module 316 removes the CP and provides the signal to an N point DFT module 318. The N point DFT transforms the signal into the frequency domain. Then, the signal is provided to a subcarrier de-mapping module 320. Let M be the modulated data symbols of the $m^{th}$ user which are grouped to form a block x. The $m^{th}$ user's received signal after de-mapping at the subcarrier de-mapping module 320 may be expressed as $$Y = \Lambda X + N \quad (1)$$

where $\Lambda$ is a M×M channel matrix having a diagonal structure, N is a noise vector having variance $\sigma_N I_N$, and $X = F_M(x)$ wherein $F_M$ is a M×M DFT matrix. The signal is then provided to an equalizer 322.

In one embodiment, the equalizer 322 may be a linear equalizer. Let Z=diag(Y) and the weight vector of the linear equalizer (LE) be denoted by W, then the output of the equalizer 322, $\check{X}_k$, in the FD at instant k is given by $$\check{X}_k = Z_k W_{k-1} \quad (2)$$

In other embodiments, the equalizer may be a DFE. The decision feedback may include a feed-forward filter and a feedback filter. In the case of the DFE, the output of the equalizer 322 may be expressed as $$\check{X}_k = Z_k F_{k-1} D_k B_{k-1} \quad (3)$$

where $F_{k-1} = [F(0)_{k-1}, F(1)_{k-1}, \ldots, F(M-1)_{k-1}]^T$ and $B_{k-1} = [B(0)_{k-1}, B(1)_{k-1}, \ldots, B(M-1)_{k-1}]^T$ are the feedforward and the feedback filters of the DFE, respectively. Note that the exact solution of these filter coefficients is not needed in the case when using an adaptive algorithm. The decision matrix $D_k$ is defined as $$D_k = \begin{cases} \text{diag}(F_M(x_k)) & \text{for training} \\ \text{diag}(F_M(\hat{x}_k)) & \text{for decision-directed} \end{cases}$$

where $\hat{x}_k$ is the decision on $\check{x}_k$ which is given as $$\check{x}_k = F_M^H \check{X}_k \quad (4)$$

Finally, the error signal, $e_k = [e_k(0), \ldots, e_k(M-1)]^T$, is given as $$e_k = \begin{cases} \check{x}_k - x_k & \text{for training} \\ \hat{x}_k - \check{x}_k & \text{for decision-directed} \end{cases} \quad (5)$$

The output of the equalizer 322 is fed to a M-point IDFT module 324 where the equalized symbols are transformed back to the time domain via IDFT. Detection and decoding take place in the time domain.

The equalizer 322 may use a PSO-based adaptive equalization algorithm. The filter coefficients used in equations (2) and (3) may be calculated adaptively using PSO as described in Al-Awami, A. T., Zerguine, A., Cheded, L., Zidouri, A., and Saif, W., "A new modified particle swarm optimization algorithm for adaptive equalization", Digital Signal process., 2011, 21, pp. 195-207 incorporated herein by reference in its entirety. The M-dimensional position and velocity vectors of the $i^{th}$ particle at the instant k as $p_{i,k} = [p_{i,k}(0), p_{i,k}(1), \ldots, p_{i,k}(M-1)]$ and $v_{i,k} = [v_{i,k}(0), v_{i,k}(1), \ldots, v_{i,k}(M-1)]$, respectively, where $p_{i,k}(l)$ represents the $i^{th}$ particle position having velocity $v_{i,k}(l)$ in the lth-dimension. Each $p_{i,k}(l)$ and $v_{i,k}(l)$ are clamped in the range $[-p_{max}, +p_{max}]$ and $[-v_{max}, +v_{max}]$, respectively, where $v_{max} = v_c p_{max}$ and $v_c$ is the velocity constraint factor. A fitness function (cost function), as explained below, is minimized to reach the global minimum. The local and global bests in a conventional PSO are found as follows. For the ith particle, among all the particle's visited positions up to the instant k, the one that gives the lowest value of the cost function is the local best of the ith particle denoted by pbest$_{i,k}$. Similarly, for the whole swarm and among all the swarm's visited positions up to the instant k, the one that gives the lowest value of the cost function is the global best of the swarm abbreviated as gbest$_k$. The velocity update equation may be expressed as $$v_{i,k+1} = y(k)[v_{i,k} c_1 * \text{rand}_1 * (\text{pbest}_{i,k} - p_{i,k}) + c_2 * \text{rand}_2 * (\text{gbest}_k - p_{i,k})] \quad (6)$$

where rand$_j$=[rand$_{0,j}$, rand$_{1,j}$, ..., rand$_{M-1,j}$]$^T$, j=1, 2 and the lth element rand$_{i,j}$ is a uniformly distributed number in the range [0,1], y(k) is a time-varying constriction factor and $c_1$ and $c_2$ are positive acceleration constants satisfying $c_1+c_2>4$. After updating equation (6), the ith particle's position is changed according to $p_{i,k+1}=p_{i,k}+v_{i,k}$.

The PSO based algorithm is applied to a block of data, i.e. one SC-FDMA symbol is used. The fitness function (cost function) used in the minimization procedure at the kth iteration may be expressed as $$J(k) = \sum_{j=0}^{M-1} |e_k(j)| \quad (7)$$

where $e_k(j)$ is the jth error at the kth instant and it may be calculated from equation (5). By taking the DFT, the FD version of the error is given as $$E_k(1) = \sum_{j=0}^{M-1} e_k(j) \exp(-\sqrt{-1} \, 2\pi jl/M), l = 0, 1, \ldots, M-1 \quad (8)$$

and also $$E_k = D_k - \check{X}_k \quad (9)$$

Minimizing equation (7) in the TD is equivalent to minimizing equation (9) in the FD as equation (7) depends on $$\sum_{j=0}^{M-1} |e_k(j)|$$

and so does $\epsilon_k$. Therefore, the absolute value of $\epsilon_k$ may be chosen as the fitness function. As $E_k=[E_k(0), \ldots, E_k(M-1)]$ hence unlike the conventional PSO, a vector of fitness function of length M is defined and used. In other words, the value of the fitness function is different for each dimension. In this way, instead of comparing particle positions to constitute pbest$_{i,k}$ for the ith particle, the best value of each dimension is found and pbest$_{i,k}$ is the amalgamation of each best dimension up to the instant k. Similarly, gbest$_k$ is the combinations of each best dimension among all pbest$_{i,k}$, i=1, 2, ..., n, where n is the swarm size (population size).

Figure 4:
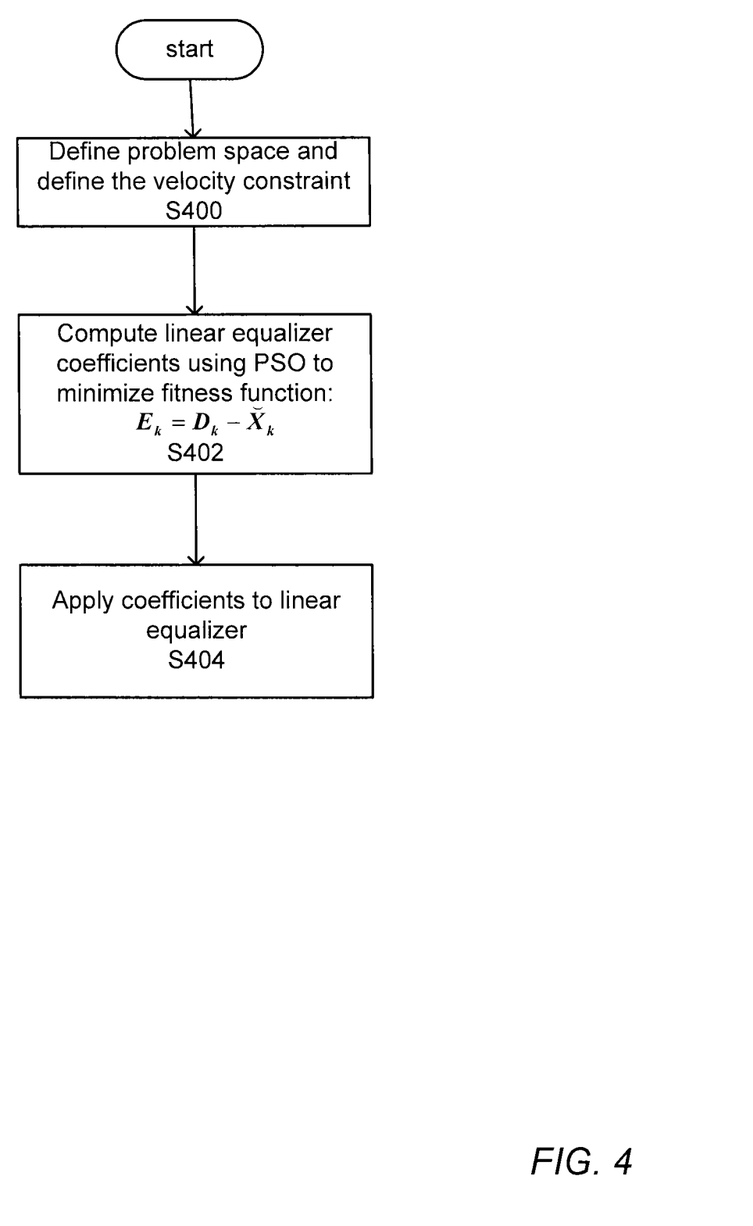
FIG. 4 is a flow chart for calculating filter coefficients of a PSO based linear equalizer according to one example.

FIG. 4 is a flow chart for equalization using a PSO based linear equalizer according to one example. At step S400, the population size n is chosen. In one embodiment, the population size may be preset by the base station 200 administrator. In other embodiments, the population size n may be based on past performance data and a desired convergence rate. A higher population size may increase the convergence rate but add to the computational complexity. At step S402, the linear equalizer coefficients are calculated as described above. The PSO minimizes the absolute value of equation (9). At step S404, the input samples are filtered using the linear equalizer coefficients to obtain output samples.

The above fitness function is valid for the LE, but in the case of the DFE, the coefficients of both the feedforward and the feedback filters are to be found which may not be possible using the same fitness function. Therefore, a constraint on the feedback filter may be introduced which cancels out pre- and post-cursors, but not the desired component as described in Benvenuto, N., and Tomasin, S., "Iterative design and detection of a DFE in the frequency domain", IEEE Trans. Commun., 2005, 53, pp. 1867-1875. The constraint is used to formulate the fitness function for DFE. The constraint-based problem for each frequency bin is given as follows:

$$\min_{F(l),B(l)} |E_k(l)|^2 \text{ subject to } \sum_{j=0}^{M-1} B_k(j) = 0 \quad (10)$$

where l=0, 1, ..., M-1. By using a Lagrange multiplier $\alpha_k$, f(k) may be expressed as $$f(k) = |E_k(l)|^2 + \alpha_k \sum_{j=0}^{M-1} B_k(j) \quad (11)$$

Now, the gradient of equation (11) with respect to F(l) and B(l) is equal to $$f(k)_{F(l)} = Y_k(l)|E_k(l)| \quad (12)$$

and $$f(k)_{B(l)} = Y_k(l)|E_k(l)| + \alpha_k \quad (13)$$

Processing circuitry compares the fitness value of all the particles and picks the one that give the lowest value. As the term $Y_k(l)$ in equation (12) is common for all the particles, hence the term may be ignored and the fitness function for the feedforward filter is $f(k)_{F(l)}=|E_k(l)|$, which is the same as for the LE. In one embodiment, in equation (13), $\alpha_k$ is updated according to the stochastic gradient method $$\alpha_{k+1} = \alpha_k + \mu \sum_{j=0}^{M-1} B_k(j) \quad (14)$$

where μ is a step size. The step size may be chosen based on past data performance.

Figure 5:
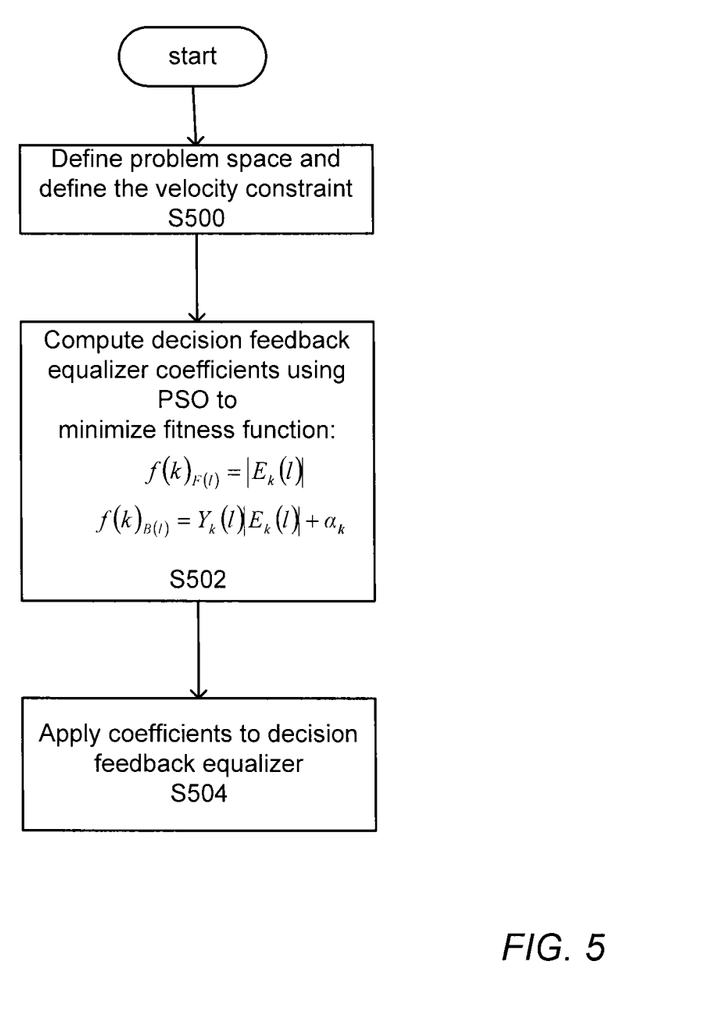
FIG. 5 is a flow chart for calculating filter coefficients of a PSO based decision feedback equalizer according to one example.

FIG. 5 is a flow chart for equalization using a PSO based DFB equalizer according to one example. At step S500, the population size n, acceleration parameters, maximum velocity, and the constriction factor are set. At step S502, the decision feedback equalizer coefficients are calculated as explained above. The PSO minimizes equations (12) and (13). At step S504, the input samples are filtered using the decision feedback equalizer coefficients to obtain output samples.

One of the problems of the PSO is that once a gbest is found, then all particles start to move towards it and hence become stagnant around the global minimum leaving empty spaces in the search space. Therefore, due to the time varying nature of the problem, the values of the equalizer taps are not fixed and when the particles become stagnant in one place, then the PSO may not be able to find a plausible solution. In selected embodiments, a re-randomization step is added to avoid stagnation of the particles. The particles are re-randomized around $gbest_k$ after certain predetermined time instants. The predetermined time instants may be chosen depending on the past performance of the equalizer. The particles are not re-randomized during the training phase. In the training phase, the main objective is to enable the particles to search for the global minimum quickly. However, re-randomization during this phase may slow down the speed of convergence of the global minimum search process. The benefit of re-randomization is its capability to allow the particles a higher probability of finding the best solution in time-varying environments. As such, it also yields a better bit error rate (BER). Re-randomization in the PSO based equalization method of the present disclosure can be thought of retraining of the recursive least squares/least mean squares (RLS/LMS) schemes which is used to avoid divergence in these algorithms. Therefore, re-randomization may improve the performance and reduce the overhead that would otherwise be required in retraining blocks needed in RLS/LMS. The equalizer and associated methodology of the present disclosure may be used to track the variations in the channel.

The computational complexity of the PSO algorithm operating in the FD (FD-PSO) is compared to that of the PSO operating in the TD (TD-PSO) for the DFE. The comparison is based on the total number of complex multiplications and additions. Table 1 summarizes the computational complexity of both algorithms. To illustrate the computational complexity, for M=512, FD-PSO is 128 times faster than TD-PSO in terms of multiplication and 103 times faster in terms of addition. Although the FD-PSO is computationally heavier than the RLS but it has a superior performance. In selected embodiments, wherein processing is carried out in the base station 200 (the uplink scenario), the computational complexity is not problematic any more for the FD-PSO algorithm.

TABLE 1

Computational complexity of PSO algorithms

| Algorithm | Multiplications | Additions |
|---|---|---|
| TD-PSO | $2M^2n + 6Mn + 6$ | $2M^2n + 12Mn - 2n + 6$ |
| FD-PSO | $8Mn + 6$ | $10Mn + 6$ |

To illustrate the capabilities of the equalization method and apparatus of the present disclosure, exemplary results are presented. The FD-PSO algorithm is tested on a LTE system (uplink SC-FDMA) with a carrier frequency of 2 GHz, a bandwidth of 5 MHz, M=512, and n=40. Quadrature phase shift keying (QPSK) modulation with interleaved mapping on a three-path Rayleigh fading channel is used. In other embodiments, other modulation techniques such as binary phase-shift keying (BPSK), quadrature amplitude modulation (M-QAM) or any other suitable modulation technique may be used as would be understood by one of ordinary skill in the art.

Figure 6:
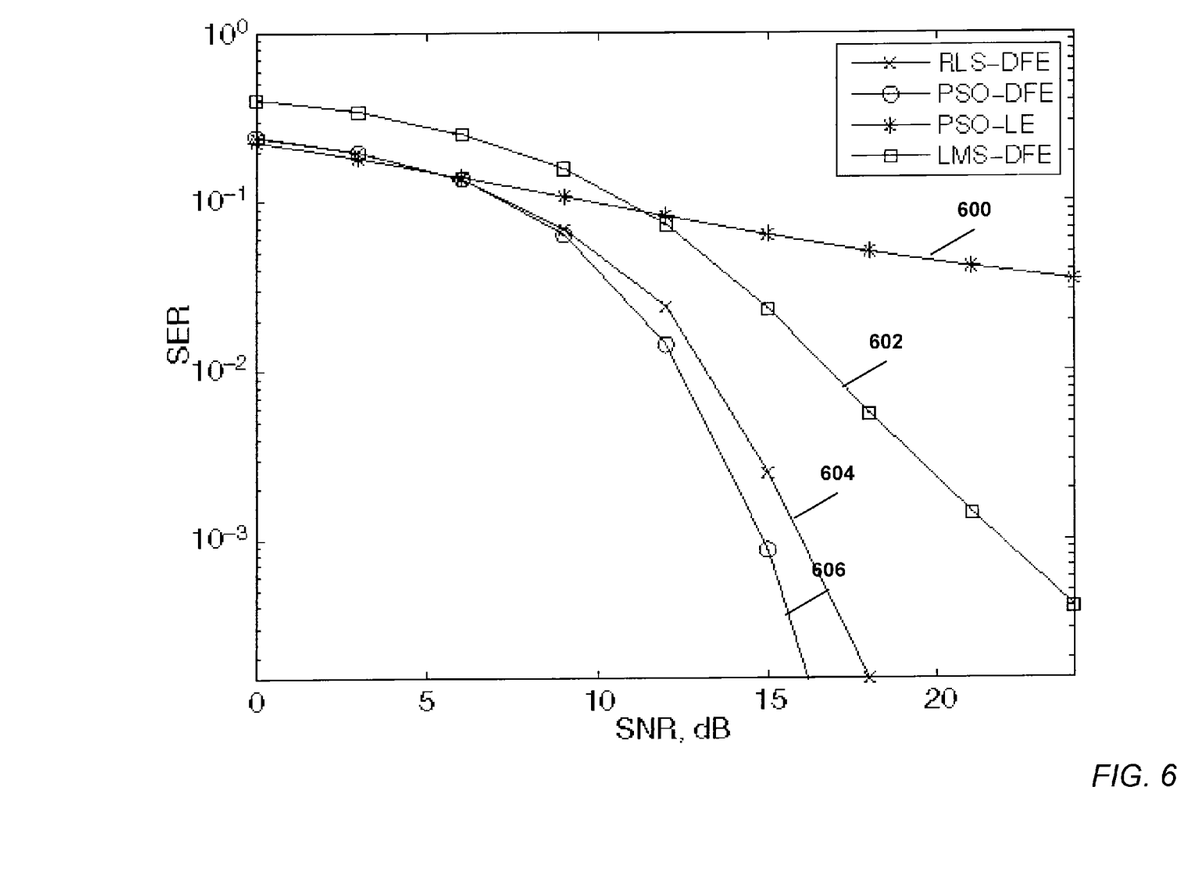
FIG. 6 is a graph that shows the symbol error rate for different equalization methods according to one example.

FIG. 6 is a graph that shows the symbol error rate performance for different equalization methods according to one example. FIG. 6 reports on the performance brought about by the use of the FD-PSO. The product of Doppler frequency, $f_d$, and sampling time, $T_s$, used is $f_dT_s$=0.0001. Almost a 2 dB improvement in SER, at SER=$10^{-3}$ has been achieved by the FD-PSO over the RLS algorithm. Trace 600 shows the SER performance for a communication system using a PSO-LE equalizer. Trace 602 shows the SER performance for a communication system using a LMS-DFE equalizer. Trace 604 shows the SER performance for a communication system that uses a RLS-DFE equalizer. Trace 606 shows the SER performance for a communication system that uses a PSO-DFE equalizer.

Figure 7:
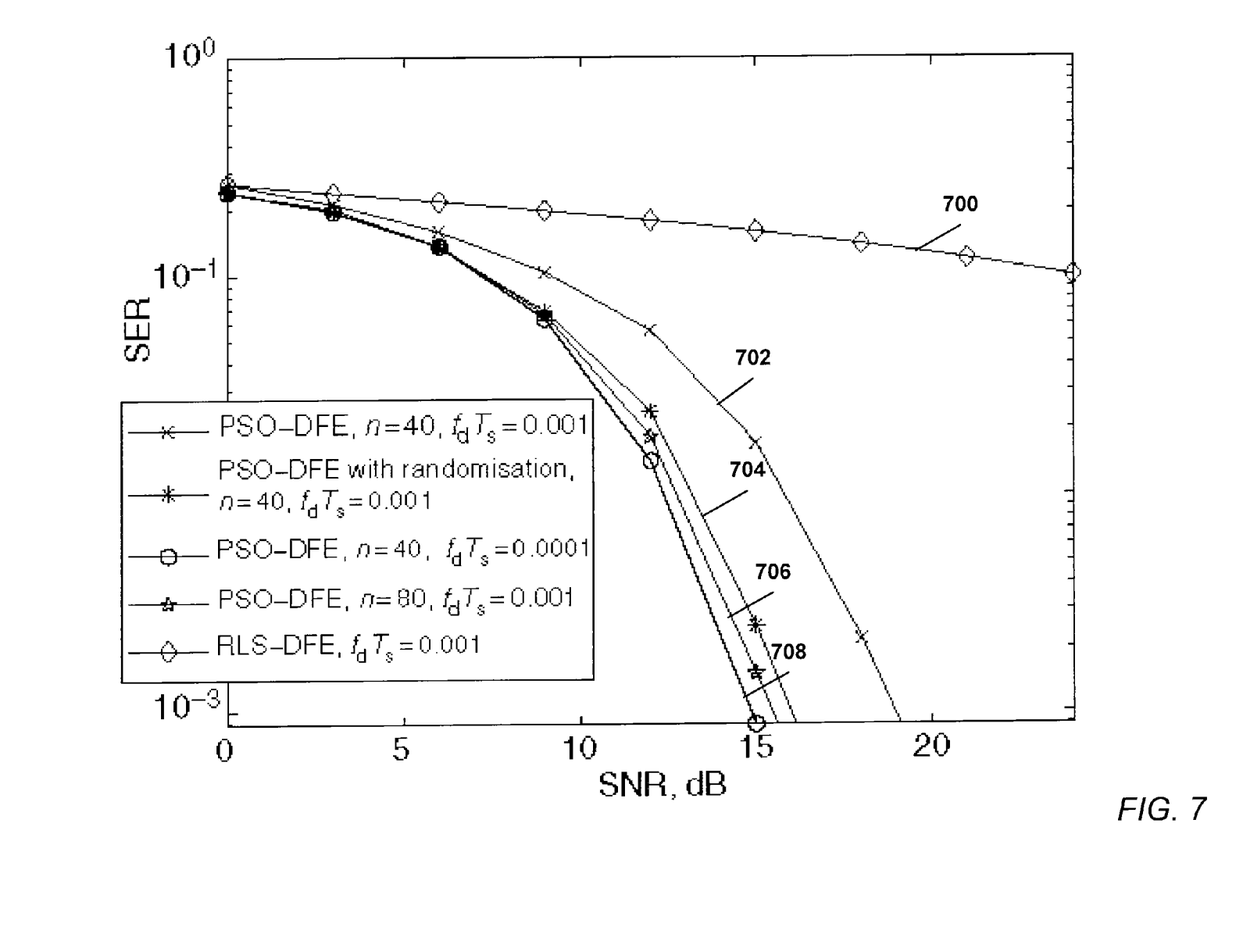
FIG. 7 is a graph that shows the symbol error rate for different equalization methods according to one example.

FIG. 7 is a graph that shows the symbol error rate performance for different equalization methods according to one example. The impact of the number of the particles and re-randomization is depicted in FIG. 7. By increasing the swarm size n, the performance of the equalizer may be improved, this being due to the fact that the particles cover all the search space, thus allowing the PSO to easily find the potential solution. Similarly, re-randomization prevents all the particles from converging to a single point, thus improving performance. At a high Doppler, PSO based equalizers perform better than RLS based equalizers, as shown in FIG. 7. Trace 700 shows the SER performance for a communication system using the RLS-DFE equalizer with $f_dT_s$=0.001. Trace 702 shows the SER performance for a communication system that uses a PSO-DFE equalizer with the number of particles taken as 40 and $f_dT_s$=0.001. Trace 704 shows the SER performance for a communication system that uses a PSO-DFE equalizer with the number of particles taken equal to 40 and $f_dT_s$=0.001. Randomization of the particles has been performed at preset time instant. Trace 704 shows a better performance when using randomization (compared to trace 702). Trace 706 shows the SER performance of a communication system that uses a PSO-DFE equalizer with the number of particles taken as 80 and $f_dT_s$=0.001. Trace 708 shows the SER performance of a communication system that uses a PSO-DFE with n=40 and $f_dT_s$=0.0001.

Figure 8:
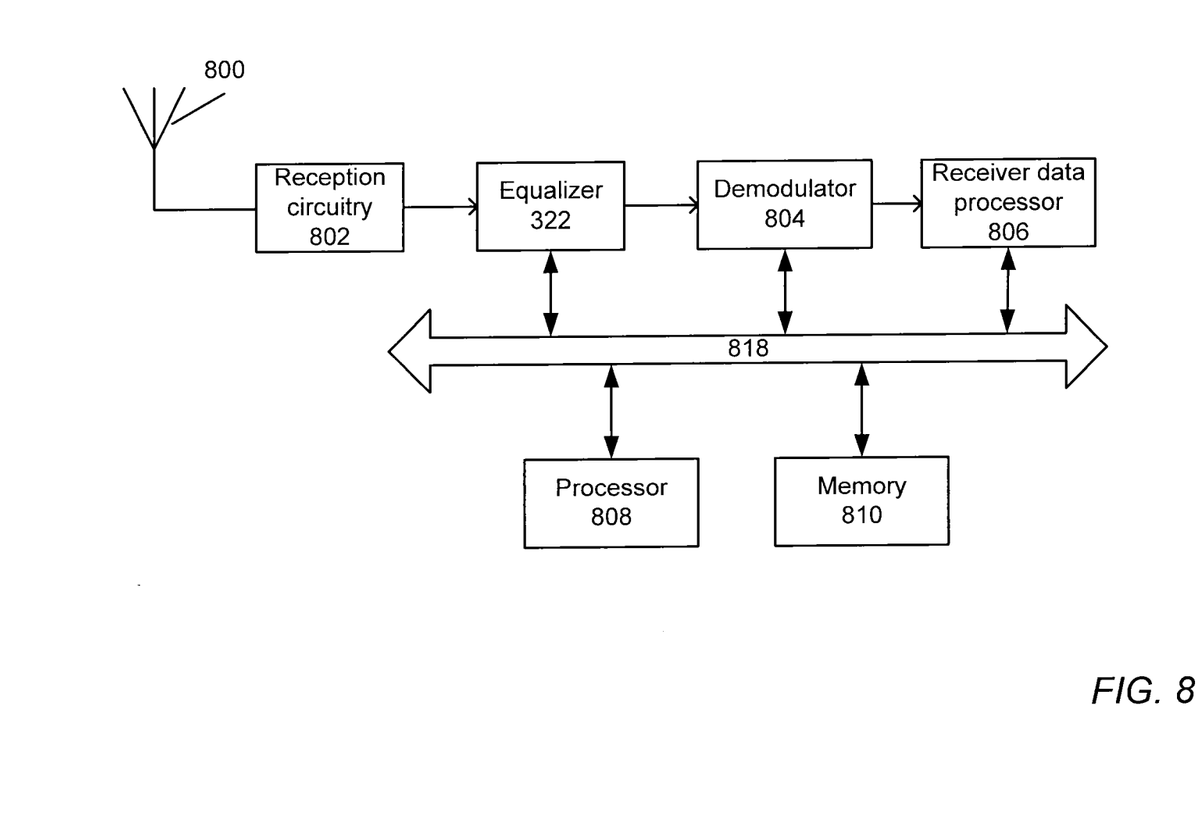
FIG. 8 is a block diagram representation of a receiver according to one example.

FIG. 8 is a block diagram representation of a receiver according to one example. The receiver 104 may include an antenna 800, reception circuitry 802, the equalizer 322, a demodulator 804, a receiver data processor 806, a processor 808, a memory 810, and a bus 818. The receiver 104 may be part of the base station 20. At the base station 200, the reception circuitry 802 may receive an RF signal from the antenna 800. The reception circuitry 802 may also receive other types of signals such as microwave, optical, or the like. The base station 200 may include a plurality of antenna. The reception circuitry 802 provides the RF signal to the equalizer 322. The equalizer 322 may use any of the equalization techniques described above to provide the output samples to the demodulator 804. The demodulator 804 process the output samples and provides symbol estimates to the receiver data processor 806. The receiver data processor 806 process the symbol estimates and provides decoded data. The memory 810 may store data and program code for the receiver 104. The memory 810 may store past data performance, noise level, number of particles used, and filter coefficients. The equalizer 322, the demodulator 804, the receiver data processor 806, the processor 808, and the memory 810 are connected to each other by the bus 818. The memory 810 may include, for example, a magnetic storage device such as a Hard Disk Drive (HDD), a semiconductor storage device, an optical storage device, or a magneto-optical storage device. The memory 810 may be utilized as working memory by the processor 808 while executing process and algorithms of the present disclosure. The antenna 800 receives electromagnetic wave signals between base stations, mobile devices, for performing radio-based communication, such as the various forms of cellular telephone communication. The processor 808 may be a Xenon or Core processor from Intel of America or an Opteron processor from AMD of America, or may be other processor types that would be recognized by one of ordinary skill in the art. Alternatively, the processor 808, the receiver data processor 806, and the equalizer 322 may be implemented on an FPGA, ASIC, PLD or using discrete logic circuits, as one of ordinary skill in the art would recognize.

The hardware description above, exemplified by any one of the structure examples shown in FIG. 8 constitutes or includes specialized corresponding structure that is programmed or configured to perform the algorithm shown in FIGS. 4 and 5.

The system of the present disclosure may be further programmed to execute any algorithm and method disclosed in N. Iqbal, A. Zerguine and N. Al-Dhabir, "Adaptive equalization using particle swarm", Electronic letters, vol. 50, pp. 469-471, the entire disclosure of which is incorporated herein by reference.

The adaptive equalization apparatus and associated methodology may be used for various communication systems such as CDMA, TDMA and FDMA.

An FD-PSO based adaptive equalizer in an SC-FDMA system is proposed. Simulation results verified that the equalizer and associated methodology of the present disclosure has a better performance than that of RLS and LMS based equalizers. Furthermore, in the case of a high Doppler, the performance of the FD-PSO algorithm can be improved by increasing the number of particles and the use of re-randomization.

A system which includes the features in the foregoing description provides numerous advantages. The equalization method of the present disclosure has a better performance over other equalization techniques. Thus, the present disclosure provides an improvement to the technical field of communication. For example, it improves the performance of mobile phone and data terminals that use LTE standard. In addition, the present disclosure has the advantage of minimizing computation in the equalizer. Thus, the present disclosure improve the functioning of the equalizer by increasing processing speed, decreasing power consumption and resulting in a chip area reduction.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A method for channel equalization in a communication system comprising:
   receiving, by a receiver, a signal;
   demapping, using processing circuitry, the signal;
   calculating, using the processing circuitry, filter coefficients of an adaptive equalizer in a frequency domain using particle swarm optimization (PSO); and
   filtering the signal using the computed filter coefficients,
   wherein the adaptive equalizer is a linear equalizer,
   wherein computing the filter coefficients of the linear equalizer using PSO comprises minimizing a vector of cost function, wherein the vector of cost function is expressed as $$E_k = D_k - \check{X}_k$$

where $D_k = \text{diag}(F_M(\hat{x}_k))$, $F_M$ is a DFT matrix, and $\check{X}_k$ is the output of the equalizer.

2. The method of claim 1, wherein the vector of cost function is based on a DFT matrix, output of the linear equalizer, and a decision matrix.

3. The method of claim 1, wherein the adaptive equalizer is a decision feedback equalizer (DFE).

4. The method of claim 3, wherein computing the filter coefficients of the decision feedback equalizer using PSO comprises minimizing at least one cost function for a feedforward filter and at least one cost function for the feedback filter.

5. The method of claim 4, wherein the at least one cost function for the feedforward is expressed as $f(k)_F = Y_k(l)|E_k(l)|$ and wherein the at least one cost function for the feedback filter is given by $f(k)_B = Y_k(l)|E_k(l)| + \alpha_k$ where $Y_k$ is a time-varying constriction factor, $|E_k(l)|$ is error term, and $\alpha$ is updated using a stochastic gradient method.

6. The method of claim 1, wherein the demapping further comprises:
   identifying a predefined search space;
   setting a predetermined population of particles within the predefined search space;
   calculating the position of each particle within the search space to identify a potential solution; and
   re-randomizing the particles to new locations when stagnation around a global best for a predetermined time interval is observed.

7. A method for channel equalization in a communication system comprising:
   receiving, by a receiver, a signal;
   demapping, using processing circuitry, the signal;
   calculating, using the processing circuitry, filter coefficients of an adaptive equalizer in a frequency domain using particle swarm optimization (PSO); and
   filtering the signal using the computed filter coefficients,
   wherein the adaptive equalizer is a decision feedback equalizer (DFE),
   wherein computing the filter coefficients of the decision feedback equalizer using PSO comprises minimizing at least one cost function for a feedforward filter and at least one cost function for the feedback filter,
   wherein the at least one cost function for the feedforward is expressed as $f(k)_F = Y_k(l)|E_k(l)|$ and wherein the at least one cost function for the feedback filter is given by $f(k)_B = Y_k(l)|E_k(l)| + \alpha_k$ where $Y_k$ is a time-varying constriction factor, $|E_k(l)|$ is error term, and $\alpha$ is updated using a stochastic gradient method.

* * * * *